United States Patent [19]

Hashimoto

[11] Patent Number: 5,138,609
[45] Date of Patent: Aug. 11, 1992

[54] AUTOMATIC CHANNEL SWITCHING FROM FALLBACK CHANNELS TO REGULAR CHANNELS

[75] Inventor: Akira Hashimoto, Tokyo, Japan
[73] Assignee: NEC Corporation, Tokyo, Japan
[21] Appl. No.: 453,891
[22] Filed: Dec. 20, 1989

[30] Foreign Application Priority Data
Dec. 20, 1988 [JP] Japan .................. 63-319554

[51] Int. Cl.$^5$ .......................... H04J 3/14; H04Q 1/20
[52] U.S. Cl. ........................... 370/16; 371/8.2; 371/20.3
[58] Field of Search ............. 370/16, 13, 17; 371/8.2, 20.3

[56] References Cited
U.S. PATENT DOCUMENTS

| | | | |
|---|---|---|---|
| 4,417,337 | 11/1983 | Favin et al. | 371/20.3 |
| 4,627,045 | 12/1986 | Olson et al. | 370/16 |
| 4,633,411 | 12/1986 | Bliss et al. | 371/20.3 |
| 4,633,473 | 12/1986 | Ratchford et al. | 371/8.2 |
| 4,680,776 | 7/1987 | Ikeuchi et al. | 370/16 |
| 4,894,827 | 1/1990 | Ramsay et al. | 371/8.2 |
| 4,964,120 | 10/1990 | Mostashari | 370/16 |

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

In a channel switching system, first and second stations are normally interconnected through first and second regular channels and switched to fallback channels established by a public switched network in the event of a fault in the regular channels. In the event of a fault in the regular channels, a tone generator at the first station transmits a tone signal to the second station through the first regular channel. A signal-to-noise (S/N) ratio detector at the second station receives it and derives a S/N ratio of the first regular channel, and transmits a S/N ratio indicating signal to the first station. A switching controller at the first station receives it to detect when the S/N ratio of the first regular channel is higher than a reference to interpret that the first regular channel has been recovered. Upon recovery of the first channel, a tone generator at the second station returns a tone signal to the first station through the second channel. A S/N ratio detector at the first station receives it and derives a S/N ratio of the second regular channel. The switching controller at the first station detects when the S/N ratio of the second regular channel is higher than the reference and switches the first station from the fallback to the regular channels and notifies the second station of this fact to allow it to be switched from the fallback to the regular channels.

5 Claims, 3 Drawing Sheets

AUTOMATIC CHANNEL SWITCHING FROM FALLBACK CHANNELS TO REGULAR CHANNELS

BACKGROUND OF THE INVENTION

The present invention relates generally to communications systems, and more specifically to protection switching for a communications system which falls back on the public switched telecommunications network in the event of a fault in a dedicated channel.

With current communications systems which rely on the public switched network to establish fallback channels in the event of a fault in a dedicated channel, human interventions are involved in the recovery procedure between the users of the regular channels and the supplier of the regular channels. Specifically, upon necessary of the regular channels, the user is informed of this fact from the supplier and makes a trip to the modem at each end of the channels to switch it back from the fallback channels to the recovered channels. In addition to this, the user needs to carry measuring apparatus to each end of the channels to measure their transmission qualities in order to confirm that they actually meet the required standards.

SUMMARY OF THE INVENTION

It is therefore an object of the present invention to provide a channel switching system which automates the channel recovery procedure.

According to the present invention, there is provided a channel switching system which normally interconnects first and second stations through first and second regular channels and interconnects the stations through fallback channels which are established by a public switched telecommunications network in the event of a fault in the regular channels.

The channel switching system comprises a tone generator at the first station for transmitting a tone signal to the second station through the first regular channel in the event of a fault in any of the regular channels. A signal-to-noise detector at the second station receives this tone signal, derives a signal-to-noise ratio of the first regular channel from the received tone signal, and transmits a quality signal to the first station, indicating the signal-to-noise ratio of the first regular channel. A switching controller at the first station receives the quality signal and detects when the signal-to-noise ratio of the first regular channel represented by the received quality signal is higher than a reference value to interpret that the first regular channel has been recovered. Upon recovery of the first regular channel, a tone generator at the second station transmits a tone signal to the first station through the second regula channel. A signal-to-noise detector at the first station receives this tone signal and derives a signal-to-noise ratio of the second regular channel from the received tone signal. The switching controller at the first station detects when the signal-to-noise ratio of the second regular channel is higher than the reference value and switches the first station from the fallback channels to the regular channels and notifies the second station of the recovery of both regular channels. On receiving the notification, a switching controller at the second station switches it back from the fallback channels to the regular channels.

BRIEF DESCRIPTION OF THE DRAWINGS

The present invention will be described in further detail with reference to the accompanying drawings, in which.

DETAILED DESCRIPTION

Figure 1:
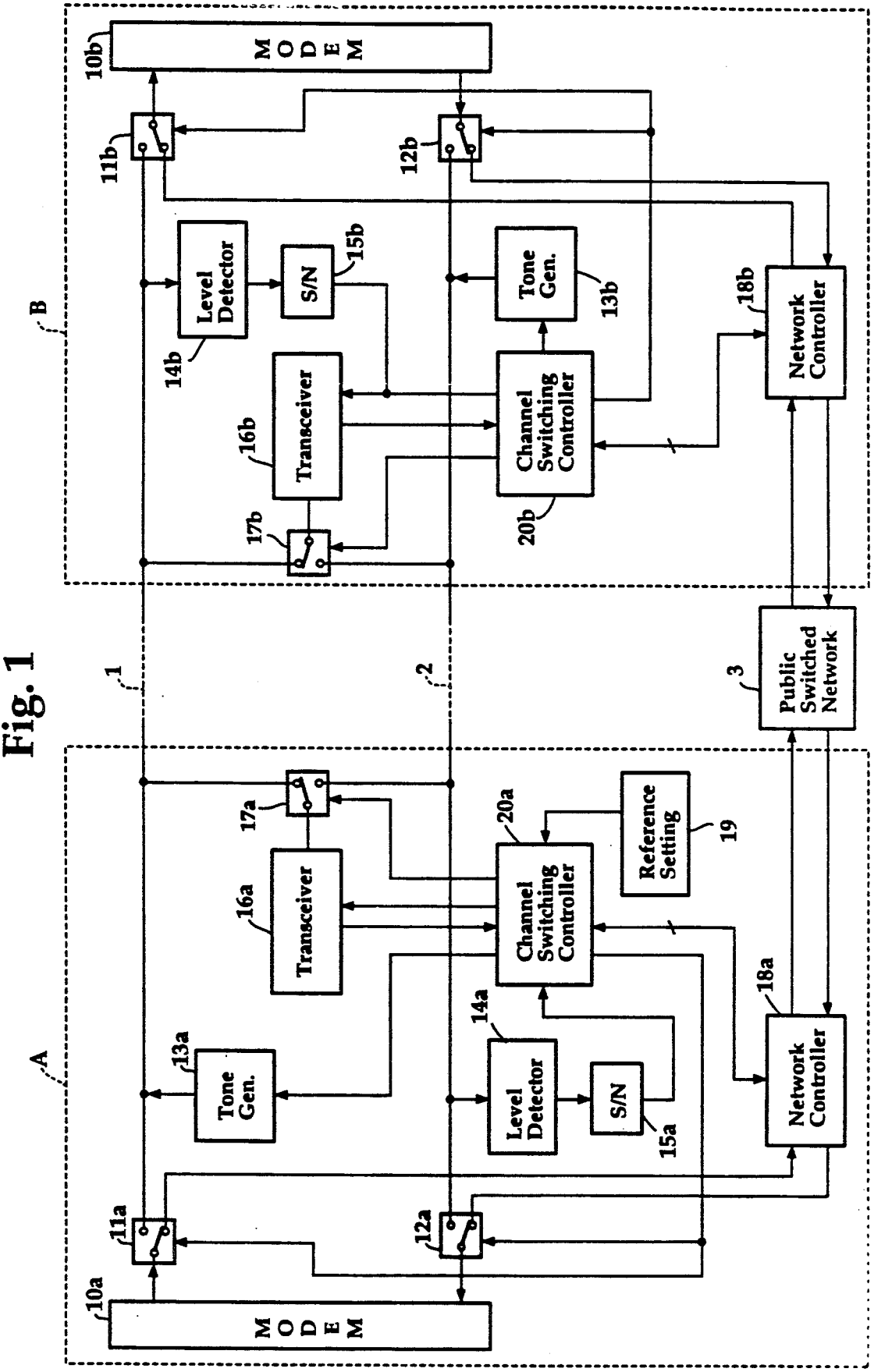
FIG. 1 is a block diagram of a channel switching system according to the present invention for switching between least, or private lines and the public switched telecommunications network.

Referring now to FIG. 1, there is shown a wire-line communications system incorporating a channel switching system of the present invention. The communications system comprises stations A and B which are normally interconnected by a dedicated channel 1 which carries signals in a direction from station A to station B and a dedicated channel 2 carrying signals in the opposite direction. Leased or private lines are employed for the dedicated channels. Each station comprises a modulator/demodulator, or modem 10 and channel changeover switches 11 and 12. Normally, the switches 11a, 12a of station A and the switches 11b, 12b of station B are in their upper position to interconnect the modems 10a and 10b through the regular channels 1 and 2. In their lower position switches 11a and 12a of station A connect the associated modem 10a to a network controller 18a. Likewise, in their lower position switches 11b and 12b of station B connect the associated modem 10b to a network controller 18b. In the event of a fault in the dedicated channels, a channel switching controller 20a at station A causes switches 11a and 12a to be moved to their lower position, and, likewise, a channel switching controller 20b at station B causes switches 11b and 12b to be moved to their lower position. When this occurs, the channel switching controller 20a supplies a network control signal to the network controller 18a to establish fallback channels to station B through the public switched telecommunications network 3, interconnecting the modems 10a and 10b through the fallback channels.

Station A includes a tone generator 13a and a level detector 14a coupled respectively to the channels 1 and 2. The output of level detector 14a is connected to a signal-to-noise ratio detector 15a to detect the S/N ratio of the signal transmitted on channel 2 and supply the S/N ratio of channel 2 to channel switching controller 20a. A reference setting circuit 19 is connected to the controller 20a. In order to determine the quality of each of the dedicated channels, controller 20a first compares the signal-to-noise ratio of channel 2 detected by the circuit 15a with a reference setting and subsequently compares the signal-to-noise ratio of channel 1 which will be detected by a signal-to-noise ratio detector 15b at station B with the same reference setting. A transceiver 16a is connected to the channel switching controller 20a to send command signals to and receive response signals from the station B. A switch 17a is provided for connecting the transceiver 16a to one of the dedicated channels according to a switching signal from the controller 20a.

In a similar manner, station B includes a tone generator 13b and a level detector 14b which are coupled to the channels 2 and 1, respectively. The output of level detector 14b is connected to a signal-to-noise ratio detector 15b to detect the S/N ratio of the signal carried on the channel 1 and supply the S/N ratio to channel switching controller 20b. A transceiver 16b is connected to the channel switching controller 20b to send command signals to and receive response signals from the station A. A switch 17b connects the transceiver 16b to one of the dedicated channels according to a switching signal from the controller 20b.

In the event of a trouble in the dedicated channel 1 or 2, the system is switched to the public switched network either in an automatic or a manual mode depending an applications. If the trouble is detected by station A, channel switching controller 20a is notified of this fact and moves the switches 11a and 12a to the lower position and applies a control signal to the network controller 18a to establish fallback channels through the public switched network 3 to station B and sends a switching command signal to the network controller 18b. This switching command signal is applied to channel switching controller 20b to move the switches 11b and 12b to the lower position.

Figure 2A:
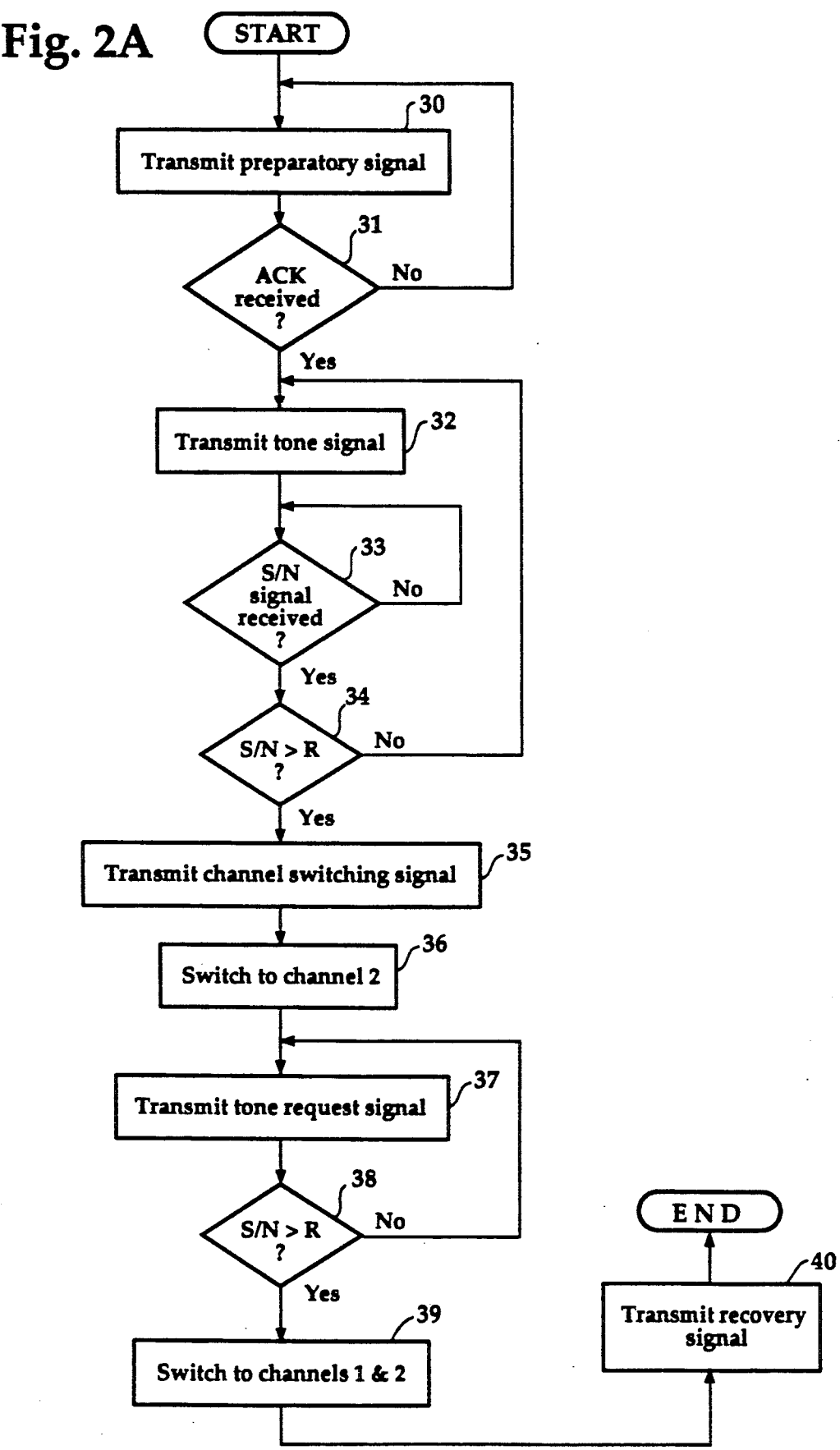
FIG. 2A is a flowchart associated with the channel switching controller of the station A of FIG. 1.
Figure 2B:
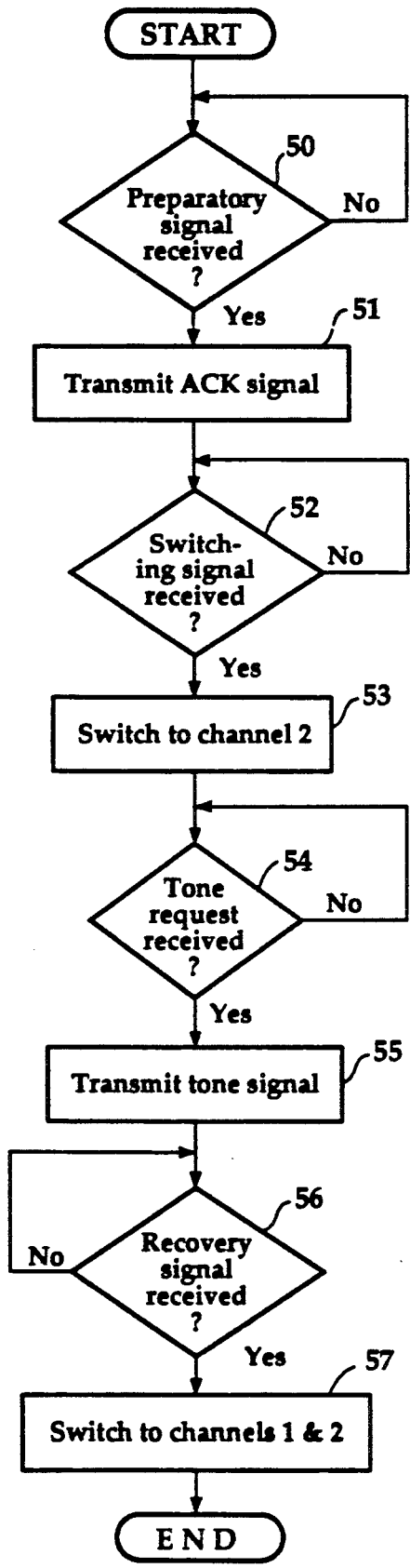
FIG. 2B is a flowchart associated with the channel switching controller of the station B of FIG. 1.

At stations A and B, restoration from the fallback channels to the dedicated channels automatically takes place in a manner as will be described with reference to FIGS. 2A and 2B. In FIG. 2A, program execution starts in the second switching controller 20a with operations block 30 which directs the sending of a preparatory signal from transceiver 16a through channel 1 to transceiver 16b. In FIG. 2B, on the other hand, program execution starts in the channel switching controller 20b with decision block 50 which checks to see if the preparatory signal sent from station A to received by transceiver 16b. If it is, exit is to operations block 51 which directs the sending of an acknowledgement signal to station A via channel 1 from transceiver 16b. At station A, control proceeds to decision block 31 to check to see if the acknowledgment signal from station B is detected by transceiver 16a. If not, control returns to block 30 to repeat the transmission of the preparatory signal. If an acknowledgment signal is received, control exits to operations block 32 which directs the tone generator 13a to apply a tone signal to the channel 1 for channel testing. This tone signal is received by station B and the level detector 14b determines its level and causes the S/N detector 15b to detect the S/N value of channel 1 and send a signal representative of the detected S/N value from transceiver 16b to station A.

At station A, decision block 33 is being executed to detect the S/N indicating signal. If the decision in block 33 is affirmative, control moves to decision block 34 to determine whether the signal-to-noise ratio of channel 1 is higher than a reference value supplied from the reference setting circuit 19. If the answer is negative, control returns to block 32 to repeatedly send a tone signal from station A to station B, and if it is affirmative, control recognizes that channel 1 has been recovered and advances to operations block 35 to send a channel switching signal through transceiver 16a through channel 1 to station B. After sending the channel switching signal, control goes to block 36 to direct the switch 17a to move to the lower position.

At station B, control is executing block 52 to detect a channel switching signal. If the channel switching signal from station A is received by transceiver 16b, control exits to operations block 53 to direct the switch 17b to move to the lower position. At station A, control moves to operations block 37 to transmit a tone request signal from transceiver 16a to station B. When this tone request signal is received by transceiver 16b (block 54), control moves to block 55 to cause a tone signal to be returned from transceiver 16b to station A through channel 2. This signal is detected at station A by the level detector 14a and the signal-to-noise ratio of channel 2 is determined by the S/N detector 15a.

Decision block 38 is then executed to determine whether the S/N value of channel 2 is higher than the reference setting. If the answer is negative, control returns to block 37 to repeatedly transmit a tone request signal to station B to receive tone signals therefrom, and if it is affirmative, control recognizes that the channel 2 has also been recovered and advances to operations block 39 to move the channel changeover switches 11a and 12a to their upper position, switching the station A from the public switched network 3 to dedicated channels 1 and 2. Exit then is to block 40 to send a recovery signal from transceiver 16a to station B, which is received by station B (block 56) to move the channel changeover switches 11b and 12b to their upper position (block 57), switching the station B from the public switched network 3 to the dedicated channels.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A channel switching system for normally interconnecting first and second stations through first and second regular channels and interconnecting said stations through fallback channels established by a public switched telecommunications network in the event of a fault in said regular channels, comprising:

first tone generator means for transmitting a first tone signal from said first station to said second station through said first regular channel in the event of said fault;

first signal-to-noise detector means for receiving said first tone signal at said second station, deriving a signal-to-noise ratio of said first regular channel from the received tone signal, and transmitting a quality signal indicative of the signal-to-noise ratio of the first regular channel to said first station;

first switching control means for receiving said quality signal at said first station and determining whether the signal-to-noise ratio of said first regular channel represented by the received quality signal is higher than a reference value, and switching the first station from said fallback channels to said regular channels if said signal-to-noise ratio is higher than the reference value;

second tone generator means for transmitting a second tone signal from said second station to said first station through said second regular channel when the signal-to-noise ratio is determined by the first switching control means as being higher than said reference value;

second signal-to-noise detector means for receiving said second tone signal at said first station and deriving a signal-to-noise ratio of said second regular channel from the received tone signal; and second switching control means for determining whether the signal-to-noise ratio of said second regular channel is higher than said reference value and switching said second station from said fallback channels to said regular channels if the signal-to-noise ratio of the second regular channel is higher than the reference value.

2. A channel switching system for a communications system including first and second stations each including a modulator/demodulator (modem), said first and second modems being normally interconnected through first and second regular channels and interconnected through fallback channels established by a public switched telecommunications network in the event of a fault in said regular channels, said first station comprising:

first tone generator means for transmitting a tone signal to said first regular channel in the event of said fault to said second station;

first signal-to-noise detector means for receiving a tone signal transmitted through said second regular channel from said second station and deriving a signal-to-noise ratio of said second regular channel from the received tone signal;

first switching means programmed to perform the steps of (a) receiving a quality signal indicative of a signal-to-noise ratio of said first channel transmitted from said second station, (b) detecting when the signal-to-noise ratio of said first regular channel represented by the received quality signal is higher than a reference value to interpret that said first regular channel has been recovered, (c) transmitting a tone request signal upon recovery of said first regular channel to said second station, (d) detecting when the signal-to-noise ratio of said second regular channel is higher than said reference value to interpret that said second regular channel has been recovered, (e) switching said first modem from said fallback channels to said regular channels, and (f) transmitting a recovery signal, said second station comprising:

second signal-to-noise detector means for receiving said tone signal transmitted by said first tone generator means through said first regular channel, deriving a signal-to-noise ratio of said first regular channel from the received tone signal to generate said quality signal, and transmitting said quality signal to said first station;

second tone generator means for transmitting a tone signal to said first station through said second regular channel upon receipt of said tone request signal; and second switching control means for switching said second modem from said fallback channels to said regular channels upon receipt of said recovery signal.

3. A method for switching a communications system from a public switched telecommunications network to first and second regular channels upon recovery of the regular channels, said communications system including first and second stations which are normally interconnected by said first and second regular channels and interconnected by fallback channels established by said public switched telecommunications network in the event of a fault in said regular channels, comprising the steps of:

a) transmitting a tone signal from said first station to said second station through said first regular channel in the event of said fault;

b) receiving said tone signal at said second station, deriving a signal-to-noise ratio of said first regular channel from the received tone signal, and transmitting a quality signal indicative of the derived signal-to-noise ratio to said first station;

c) receiving said quality signal at said first station and detecting when the signal-to-noise ratio of said first regular channel represented by the received quality signal is higher than a reference value to interpret that said first regular channel has been recovered;

d) transmitting a tone request signal from said first station to said second station upon recovery of said first regular channel;

e) receiving said tone request signal at said second station and transmitting a tone signal to said first station through said second regular channel;

f) receiving said tone signal at said first station and deriving a signal-to-noise ratio of said second regular channel from the received tone signal;

g) detecting when the signal-to-noise ratio of said second regular channel is higher than said reference value to interpret that said second regular channel has been recovered;

h) switching said first station to said first and second regular channels from said fallback channels and transmitting a recovery signal to said second station; and i) switching said second station to said first and second regular channels from said fallback channels upon receipt of said recovery signal at said second station.

4. A channel switching system for normally interconnecting first and second stations through a regular channel and interconnecting said stations through a fallback channel established by a public switched telecommunications network in the event of a fault in said regular channel, comprising:

tone generator means for transmitting a tone signal from said first station to said second station through said regular channel in the event of said fault;

signal-to-noise detector means for receiving said tone signal at said second station, deriving a signal-to-noise ratio of said regular channel from the received tone signal, and transmitting a quality signal indicative of the signal-to-noise ratio of the regular channel to said first station; and switching control means for receiving said quality signal at said first station and switching said first and second stations from said fallback channel to said regular channel when the signal-to-noise ratio of said regular channel represented by the received quality signal is higher than a reference value.

5. A method for switching a communications system from a fallback channel established through a public switched telecommunications network to a regular channel upon recovery of the regular channel, said communications system including first and second stations which are normally interconnected by said regular channel and interconnected by said fallback channel in the event of a fault in said regular channel, comprising the steps of:

a) transmitting a tone signal from said first station to said second station through said regular channel in the event of said fault;

b) receiving said tone signal at said second station, deriving a signal-to-noise ratio of said regular channel from the received tone signal, and transmitting a quality signal indicative of the derived signal-to-noise ratio to said first station;

c) receiving said quality signal at said first station and comparing the signal-to-noise ratio of said regular channel represented by the received quality signal with a reference value;

d) if the signal-to-noise ratio is determined as being higher than said reference value by the step (c), switching said first station to said regular channel from said fallback channel and transmitting a recovery signal from the first station to said second station; and e) switching said second station to said regular channel from said fallback channel upon receipt of said recovery signal at said second station.

* * * * *